(12) United States Patent
Barolak et al.

(10) Patent No.: US 7,773,454 B2
(45) Date of Patent: Aug. 10, 2010

(54) METHOD AND APPARATUS FOR CEMENT EVALUATION USING MULTIPLE ACOUSTIC WAVE TYPES

(75) Inventors: Joseph Gregory Barolak, Spring, TX (US); Douglas J Patterson, Spring, TX (US); Alexei Bolshakov, Pearland, TX (US); Vladimir Dubinsky, Houston, TX (US); Xiao Ming Tang, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 1206 days.

(21) Appl. No.: 11/359,172

(22) Filed: Feb. 22, 2006

(65) Prior Publication Data

US 2007/0206439 A1 Sep. 6, 2007

(51) Int. Cl.
 *G01V 1/48* (2006.01)
 *G01V 1/50* (2006.01)
(52) U.S. Cl. ............................ 367/35; 367/31; 181/105
(58) Field of Classification Search ................... 367/25, 367/31, 32, 35; 181/105
See application file for complete search history.

(56) References Cited

U.S. PATENT DOCUMENTS 4,802,145 A    1/1989   Mount, II
4,885,723 A *  12/1989  Havira et al. .................. 367/35
4,896,303 A *  1/1990   Leslie et al. .................... 367/35
4,992,994 A    2/1991   Rambow et al.
5,001,676 A    3/1991   Broding
5,089,989 A *  2/1992   Schmidt et al. ................ 367/35
5,763,773 A    6/1998   Birchak et al.
5,874,676 A    2/1999   Maki, Jr.
6,018,496 A *  1/2000   Stanke et al. .................. 367/35
6,310,426 B1   10/2001  Birchak et al.
6,483,777 B1   11/2002  Zeroug
7,525,872 B2 * 4/2009   Tang et al. ..................... 367/35

FOREIGN PATENT DOCUMENTS

EP      1 505 252 B1      9/2005

OTHER PUBLICATIONS

Sinha, et al. "Applications of Sonics and Ultrasonics in Geophysical Prospecting." 1999 IEEE Ultrasonics Symposium.*
Smaine Zeroug and Benoit Froelich, Ultrasonic Leaky-Lamb Wave Imaging Through a Highly Contrasting Layer, 2003 IEEE Ultrasonics Symposium, pp. 794-798.

* cited by examiner

*Primary Examiner*—Scott A Hughes
(74) *Attorney, Agent, or Firm*—Bracewell & Giuliani LLP

(57) ABSTRACT

A method and apparatus useful to determine the integrity of a cement bond log disposed in the annular space between a casing and a wellbore. The method and apparatus produce a transversely polarized shear wave and emit the wave through the casing and into the wellbore. The transversely polarized shear wave attenuates upon passage through the cement bond log. The integrity of the cement bond log can be determined through an analysis and evaluation of the attenuation results.

27 Claims, 4 Drawing Sheets

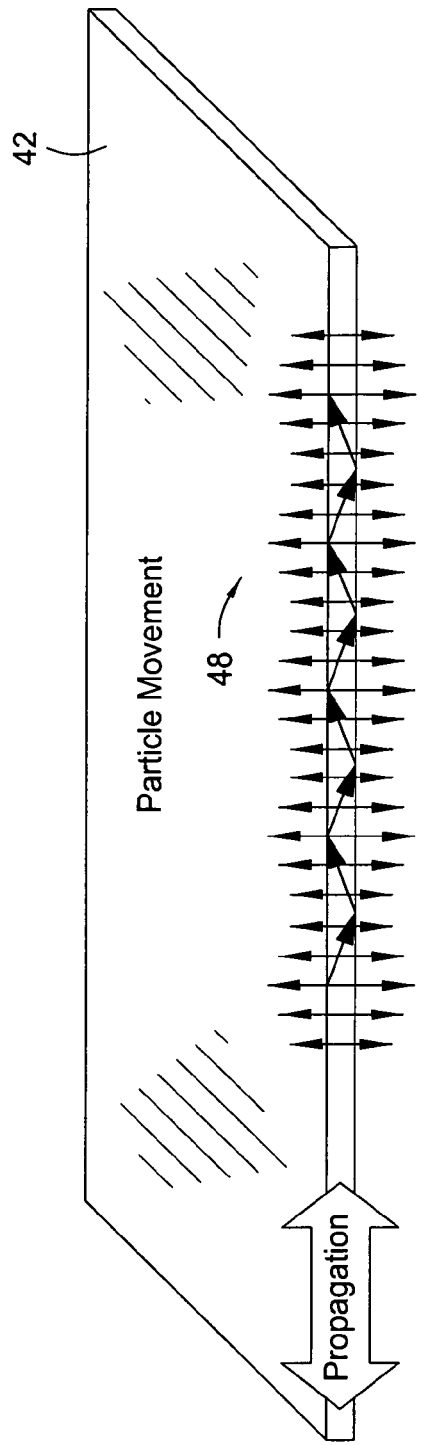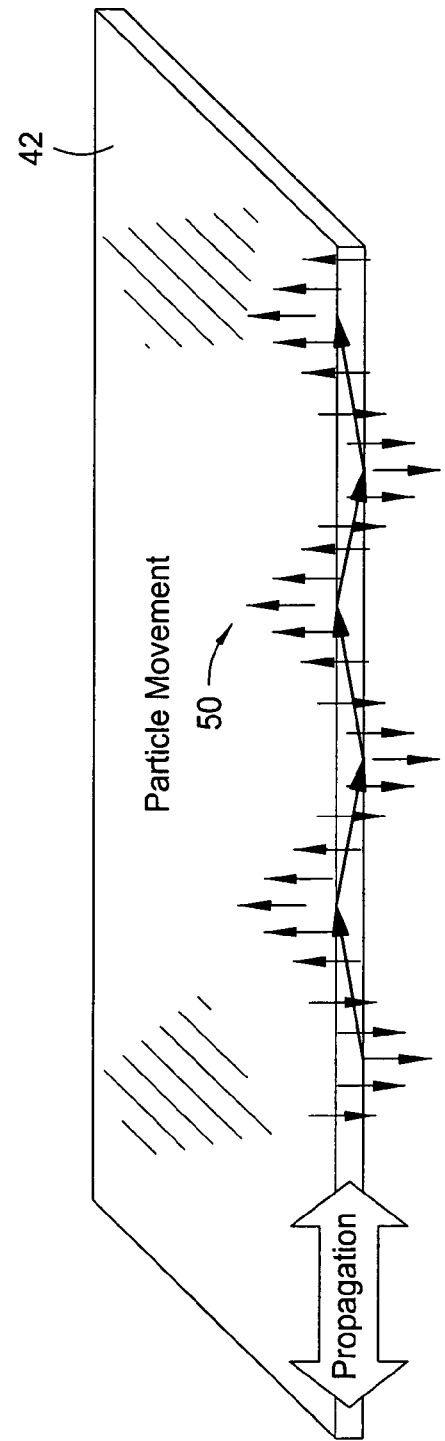

METHOD AND APPARATUS FOR CEMENT EVALUATION USING MULTIPLE ACOUSTIC WAVE TYPES

BACKGROUND OF THE INVENTION

1. Field of the Invention

The invention relates generally to the field of production of hydrocarbons from wellbores. More specifically, the present invention relates to a method and apparatus to evaluate the integrity of bonds that adhere wellbore casing to a wellbore.

2. Description of Related Art

Hydrocarbon producing wellbores 2 are drilled from the surface 16 into a subterranean formation 17 containing hydrocarbons entrained therein. Set within the wellbore 2 is casing 4 bonded to the inner surface of the wellbore 2. The casing is bonded within the wellbore 2 by adding cement 6 within the annulus formed between the outer diameter of the casing 4 and the inner diameter of the wellbore 2. The resulting cement bond not only adheres the casing 4 within the wellbore 2, but also serves to isolate adjacent zones (Z1 and Z2) within the formation 17 from one another. Isolating adjacent zones can be important when one of the zones contains oil or gas and the other zone includes a non-hydrocarbon fluid such as water. Should the cement 6 surrounding the casing 4 be defective and fail to provide isolation of the adjacent zones, water or other undesirable fluid can migrate into the hydrocarbon producing zone thus diluting or contaminating the hydrocarbons within the producing zone.

To detect possible defective cement bonds, downhole tools 8 have been developed for analyzing the integrity of the cement 6 bonding the casing 4 to the wellbore 2. These downhole tools 8 can be disposed within the wellbore 2 on a wireline 10 that is connected to a surface truck 14 via a pulley system 12. Typically, transducers 18 are disposed on the outer surface of the tool 8 capable of emitting acoustic waves into the casing 4 and recording the attenuation of the acoustic waves as they travel, or propagate, across the surface of the casing 4. The transducers 18 can either only transmit and receive, or can include those capable of transmitting acoustic signals and receiving a corresponding acoustic signal propagating along the casing. By analyzing the propagation velocity and attenuation of the received acoustic wave, the efficacy and integrity of the cement bond can be evaluated. As is known, pads 19 can be attached to the outer surface of the downhole tool 8 that provide a pedestal on which the transducers 18 can be mounted.

The amount of attenuation however can depend on how the acoustic wave is polarized and coupling condition between the casing 4 and the cement 6 bonding the casing 4 to the wellbore 2. Typical downhole tools 6 having acoustic wave transducers 18 generate acoustic waves that are polarized perpendicular to the surface of the casing 4. Such waves are referred to as compression/shear or P-SV waves since the particle motion direction of either compressional (P) or shear (S) component of the acoustic wave is in a vertical (V) plane perpendicular to the casing 4. The attenuation of the acoustic wave as it propagates along the surface of the casing 4 varies in response to the condition of the cement bond and also in response to the type of cement 6 disposed between the casing 4 and the formation 17. More specifically, as the acoustic wave propagates along the length of the casing 4, the wave loses, or leaks, energy into the formation 17 through the cement bond—it is this energy loss that produces the attenuation of the acoustic wave.

Conversely, when the casing 4 is not bonded, a condition also referred to as "free pipe", fluid from the formation 17 surrounds the casing 4 instead of cement 6. The fluid behind the casing 4 does not provide for shear coupling between the casing 4 and the formation 17. Loss of shear coupling significantly reduces the compressional coupling between the casing 4 and the formation 17. This result occurs since fluid has no shear modulus as well as a much lower bulk modulus in relation to cement. Because of these physical characteristics of fluid, the entire SV component of the P-SV wave and a large portion of the P component of the P-SV wave do not propagate outside of the casing 4 and thus experience a much reduced attenuation.

Reduced attenuation of an acoustic wave is not limited to situations where the casing 4 is surrounded by fluid, but the presence of some cements can also significantly reduce acoustic wave attenuation. For example, light weight cement (LWC), or cement having a density less than approximately 12 lbs/gal can reduce acoustic wave attenuation. Light weight cement has a shear modulus, thus light weight cement can maintain shear coupling between the casing 4 and the formation 17. However, the density of light weight cement is not substantially greater than the density of many fluids (such as water), thus the attenuation of some acoustic waves, especially P-SV waves, is diminished when encountering casing 4 surrounded by a light weight cement. The result of this reduced attenuation is a decreased ability to detect the difference between fluid and light weight cement as well as a diminished capacity to detect poor cement bonds in light weight cement.

In spite of recent advances in the development of casing bond interrogation devices, room for improving the accuracy and preciseness of these devices still exists.

BRIEF SUMMARY OF THE INVENTION

One embodiment of the present invention includes a method of evaluating a casing bond disposed between a casing and a wellbore comprising, (a) inducing a shear wave into the casing, (b) monitoring the shear wave, (c) inducing a Lamb wave into the casing, (d) monitoring the Lamb wave, and (e) estimating a characteristic of the casing bond based on the monitoring. Additionally, the present method includes determining the casing bond integrity. The step of determining the bond integrity may be accomplished by monitoring the shear wave. The method considered herein may further include determining the presence of a micro-annulus as well as determining the presence of free pipe conditions. The steps of inducing the shear wave and inducing the Lamb wave can occur sequentially or simultaneously. The shear wave can be a horizontal wave (transversely polarized shear wave), a vertically polarized shear wave any other type of polarized shear wave, and combinations thereof. The Lamb wave of this method includes both symmetric, asymmetric, and all wave modes thereof.

The step of determining the presence of a micro-annulus can be accomplished by monitoring the Lamb wave. The size of a micro-annulus can be calculated based on the step of monitoring the Lamb wave. The method may also include determining bond properties, wherein the properties can be shear, compressional, density, and combinations thereof.

The step of determining the presence of a free pipe conditions may be accomplished by monitoring the Lamb wave. The method can also further include determining attenuations of different Lamb modes. The casing bond to be evaluated can comprise cement and the method can further comprise determining the compressional velocity of the cement as well as a step of estimating the thickness of the casing bond. The type of casing bond includes regular cement, light weight cement, and free pipe.

The step of inducing the shear wave and the Lamb wave can be accomplished by a piezoelectric device, an electrically magnetized acoustic transmitter, a pulsed laser device, a flexural resonator, or combinations thereof. The step of monitoring the shear wave and the Lamb wave may be accomplished by a piezoelectric device, an electrically magnetized acoustic transmitter, or combinations thereof.

BRIEF DESCRIPTION OF THE SEVERAL VIEWS OF THE DRAWING.

FIGS. 4a and 4b are a perspective view of particle movement of a Lamb wave in a plane.

DETAILED DESCRIPTION OF THE INVENTION

The present invention includes a method and apparatus useful in determining characteristics of a casing bond disposed between a casing and a wellbore. The characteristics of the casing bond include the quality of the casing bond, the integrity of the cement that comprises the bond, the type of cement, and the thickness of the casing bond. The method generally involves inducing different types and modes of acoustic waves in the casing proximate to the location where the casing bond is to be evaluated. The acoustic waves propagating within the casing can then be monitored to estimate characteristics of the casing bond in an area referred to as the region or zone of interest. It is well within the scope of those skilled in the art to ascertain casing bond characteristics based on monitoring the induced acoustic waves, furthermore, this can be accomplished without undue experimentation.

Figure 1:
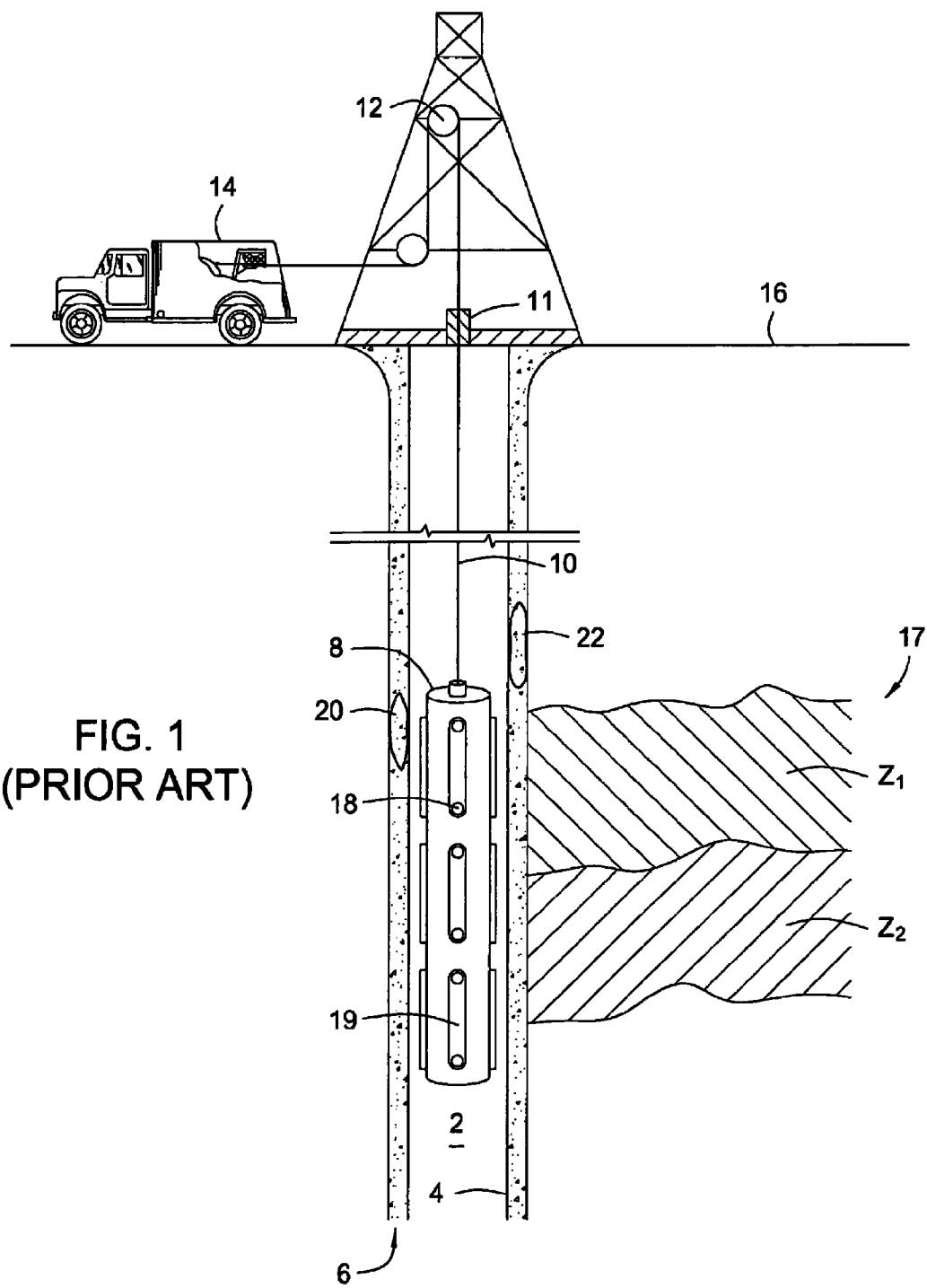
FIG. 1 is a partial cutaway side view illustration of a logging tool within a wellbore.
Figure 2:
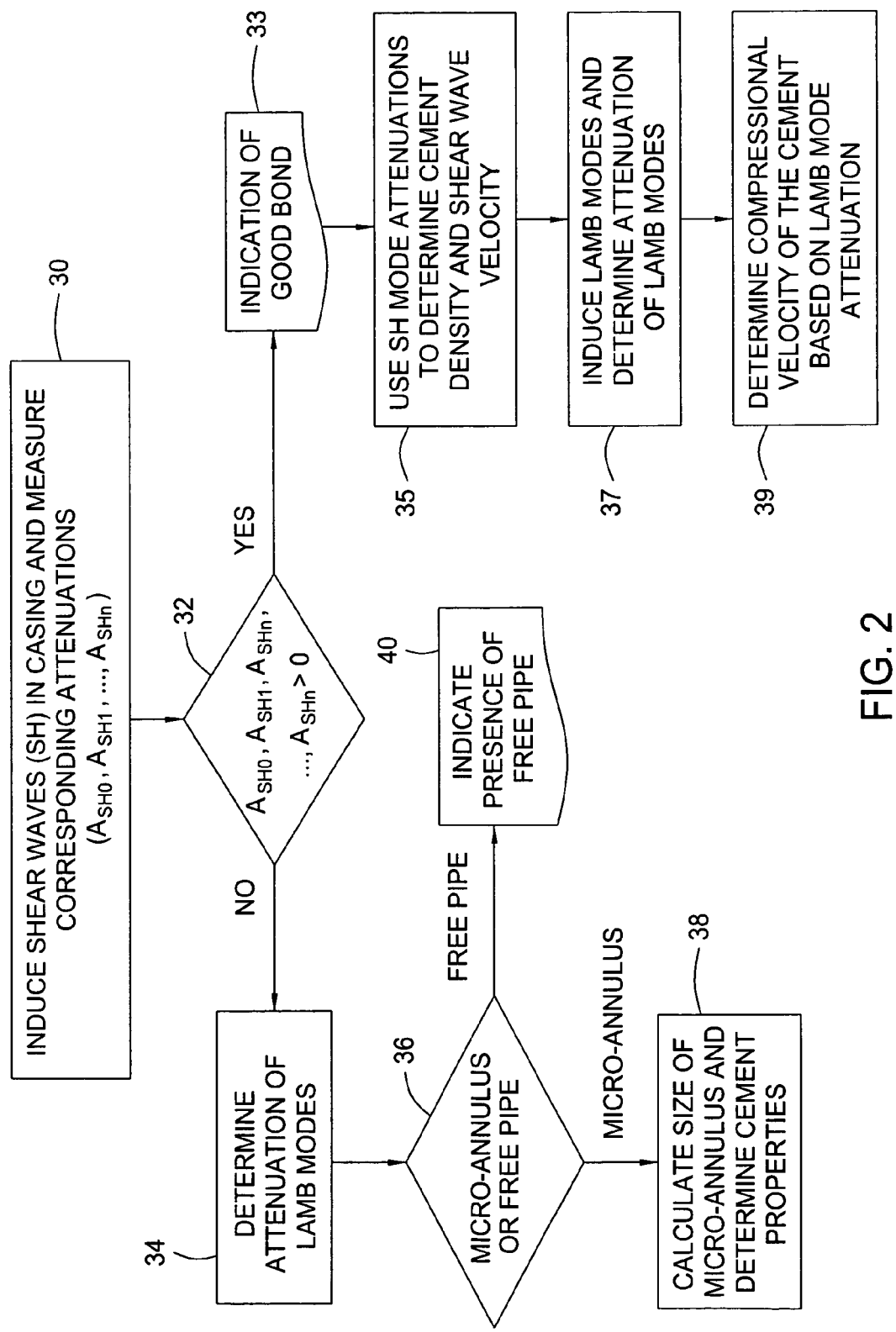
FIG. 2 is a flow chart of a method of determining cement bond properties and characteristics.

One embodiment of the method of the present disclosure described herein is illustrated in flowchart form in FIG. 2. In the embodiment as illustrated, the method is initiated after lowering a downhole tool 8 within a well bore 2. More specifically, the downhole tool 8 should be in proximate to the portion of the casing in which casing bond information is to be obtained, i.e. the region of interest. Signals, such as acoustic waves are then produced by a transducer 18 and directed from the downhole tool 8 into the surrounding casing 4. Directing the signals into the casing 4 thereby induces a corresponding wave that propagates through the casing 4.

In the embodiment of the method described herein, shear waves are initially induced into the casing by the downhole tool 8 (step 30). The corresponding attenuations of the shear waves can then be recorded by a receiver transducer. As previously noted, the waves can be induced within the casing 4 by a transmitting transducer, and the propagation of the waves through the casing 4 can be recorded with a receiver transmitter. Optionally, each transmitting transducer can also function as a receiving transducer thereby inducing waves into the casing 4 as well as receiving and recording induced waves.

The types of transducers considered for use with the present method is not confined to a single type of transmitter, but can include any transducer capable of inducing a signal within the associated casing 4 and receiving and recorded the subsequently formed acoustical wave as it travels to the casing 4. Examples of suitable transducers include piezo-electric devices, electro magnetic acoustic transducers, wedge type transducers, pulsed laser devices, flexural resonators, and any other currently used or later developed device capable of creating such a signal within the casing 4.

As shown in step 30 of the method of FIG. 2, the shear waves induced within the casing 4 can be conducted at various modes. Once the attenuated modes are recorded, the magnitudes of the values of those attenuations can then be analyzed (step 32). If it is determined that the magnitude of the measured shear modes is at or close to 0, this can be an indication of free pipe surrounding the analyzed region, or a micro annulus 20. Conversely, if the measured attenuation value of the induced shear waves is greater than 0, this can indicate the presence of a good bond in the area of interest (step 33). The present method disclosed herein then involves the subsequent application of acoustic signals having the form of Lamb modes within the casing, irrespective of the results of the shear wave analysis.

Once the results of the shear wave interrogation reveals that a poor or no bond exists around the region of interest, additional information can be gathered about the casing by application of Lamb mode waves in this region (step 34). Similar to inducing the shear waves within the casing, the Lamb modes are induced within the casing and their subsequent attenuations are recorded and measured with the downhole tool 8. The Lamb waves can be generated by the same acoustical source used to generate the shear waves. Optionally, different acoustical sources can be used for this application. Knowing the Lamb mode attenuation within the casing 4, the presence of a micro annulus or free pipe situation (step 34) within the zone of interest can then be determined. The determination of a free pipe situation or a micro annulus can be evaluated either by an empirically derived comparison, or by a comparison to experimentally obtained attenuation results. Test data can be acquired by sampling Lamb wave attenuation data on a test stand comprising casing bonded by cement, where the cement has free pipe regions and micro annulus regions. Also, the test stand model should be representative of the casing and cement that is disposed in the wellbore 2 being sampled. Having sampled the downhole data and the test stand data, these results can then be compared for distinguishing between a micro annulus condition or a free pipe condition. It is well within the scope of those skilled in the art to analyze Lamb mode attenuation data and determine the presence of either micro annulus or a free pipe situation based on that data (step 36). Optionally, mathematic modeling can be implemented to determine the presence of micro annulus or free pipe in the zone of interest. Should it be determined that free pipe surrounds the area of interest, the method allows for an indication of that situation (step 40).

If it is determined that the area of interest is surrounded by or includes a micro annulus, the size of the micro annulus as well as the cement properties in that region can be calculated (step 38). Some of these properties include the shear, the compressional value, the density, as well as combinations of these properties. The way that these values can be determined is similar or identical to the way that the presence of a free pipe or micro annulus is determined. For example, test data from a test stand of cement having known properties can be determined with the above described procedure, and these values can then be compared with the data recorded from within the wellbore 2. Typically, the attenuation of Lamb waves through a microannulus is less than the Lamb wave attenuation in a bonded situation but greater than Lamb wave attenuation in free pipe.

As previously discussed, upon determination that the induced shear waves are measureable, i.e. have a magnitude of greater than 0, it can then be deduced that the cement bond surrounding an area of interest is adequate (step 33). Subsequent to the determination of the adequacy of the bond, the shear wave attenuation can be further evaluated to determine the cement density as well as the shear velocity of the cement (step 35). Evaluating cement density and shear wave velocity based upon on shear wave mode attenuation, is done much in the same manner as evaluating free pipe or micro annulus presence and magnitude. That is, the shear wave attenuation can be compared to empirically derived data to obtain quantitative values for cement density and shear wave velocity.

Lamb waves can then be induced into the cement bond, such as by with transducers as previously described, and the attenuation of these Lamb modes propagating through the casing 4 can be received and recorded with these transducers (step 37). After receiving the Lamb modes of step 37, the compressional velocity of the cement can then be determined as well (step 39). As discussed below, the Lamb waves considered for use with the present method include symmetric and asymmetric, and all modes thereof. It should be pointed out that inducement of the Lamb wave may occur subsequent to that of the shear wave or simultaneously with initiation of the shear wave.

Figure 3:
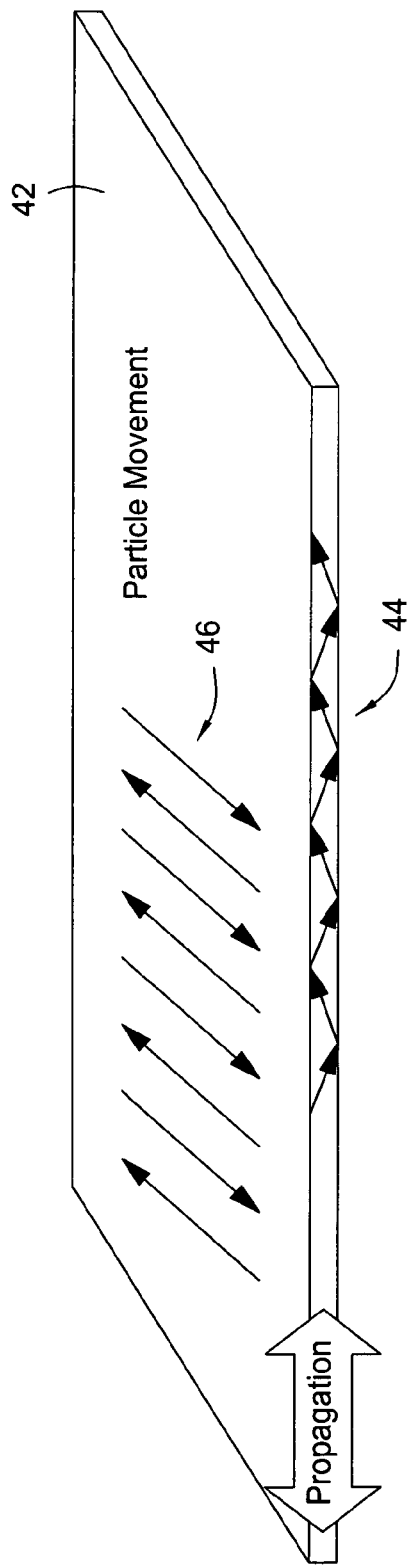
FIG. 3 shows in perspective view shear wave particle movement on a plate.
Figure 5:
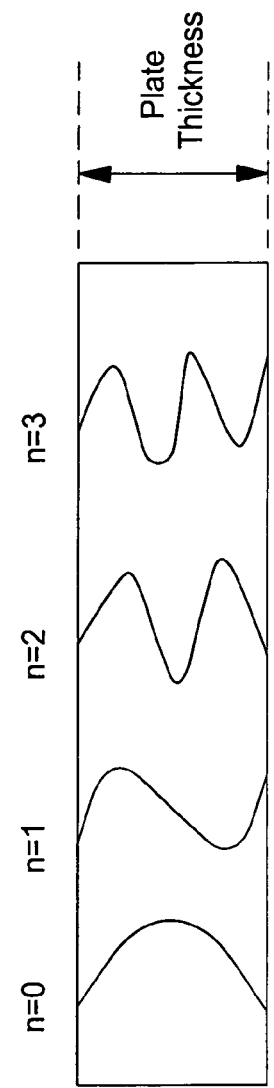
FIG. 5 is a cutaway view showing wave movement through a plate thickness.

Referring now to FIG. 3, representations of a shear waveform in a horizontal configuration are shown propagating within a wave medium 42. This waveform can also be referred to as a transversely polarized shear wave (TPSW). A series of arrows 44 are provided to illustrate how the shear wave propagates through the wave medium 42. Arrows 46 demonstrates how a horizontal shear wave displaces particles within a medium. As shown, the particle displacement is in the horizontal plane of the medium in which it is traveling. While a horizontally polarized shear wave is shown, the use of shear waves with regard to the present method can include those vertically polarized, or any other configuration, orientation, or polarized direction of shear waves. The frequencies and wave lengths of the induced shear waves can be chosen based on the characteristics of the particular transducer creating the waves as well as the wave modes used. It is within the scope of skilled artisans to choose such frequencies and wave lengths. Examples of acoustic sources for creating shear waves include electro magnetic acoustic transducers (EMAT) as well as wedge type transducers.

FIGS. 4a and 4b illustrate examples of Lamb wave motion. In each of these figures the wave motion is illustrated by a series of vertical arrows that demonstrate the amplitude of the wave motion as well as oblique arrows point along the edge of the wave medium illustrating the propagation of the wave passing through the wave medium. It should be pointed out that the wave form of FIG. 4a represents a symmetric Lamb wave 48 and the wave form as shown in FIG. 4b represents an asymmetric Lamb wave 50. Lamb waves are similar to longitudinal waves, with compression and rarefaction, and they bound together by the sheet or plate surface causing a wave guide effect. Lamb waves can be a complex vibrational wave capable of traveling through the entire thickness of the wave medium 42. Propagation of the Lamb waves is dependent upon density, elasticity, and material properties of the wave medium. These waves are also influenced a great deal by the frequency and the material thickness. With Lamb waves, many modes of particle vibration are possible, however the two most common are the symmetrical and the asymmetrical modes. The frequency and wave lengths of the induced Lamb waves can be chosen based on the characteristics of the particular transducer creating the waves as well as the wave modes used. It is within the scope of skilled artisans to choose such frequencies and wave lengths. Lamb waves can be induced by piezo-electric devices, electro magnetic acoustic transducers, as well as wedge type transducers.

Lamb waves may result from the constructive interference of P (compressional) and $S_v$ (shear vertical) type of waves. When introduced into a well casing, these waves typically propagate around the circumference or axis of the casing. However, such propagation is not limited to circumferential travel, but also includes axial travel, propagation in a helical pattern, and any other pattern of wave propagation through and/or along casing. Very often, the first symmetric mode ($S_0$) of the Lamb wave is called an extensional or dilatational wave. The first symmetric mode may resemble a longitudinal or P-wave in an unbounded solid. At low frequencies, the velocity of this mode is often equivalent to the plate velocity of the extensional wave. When the wave medium is steel, the velocity is very close to the longitudinal velocity of the material of the wave medium, thus rendering the mode its name (P-wave). Accordingly, the "P-wave" in a pipe can be considered as one mode of a Lamb wave. However, it should be pointed out that many Lamb wave modes exist that fall well outside of the accepted definition of a P-wave or compressional mode wave.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the present method is applicable in any wellbore 2 having any type of fluid therein, including typical downhole fluids, water, brine, drilling fluids, as well as gas filled boreholes that may have methane, carbon dioxide, or any other downhole gas encountered. Also, the same transducers used in creating the Lamb wave can be used to produce the shear waves, different transducers can be used, or a combination of these can be coupled together. Moreover, these transducers can be stacked on a single mount, or can be disposed at different locations on a downhole tool. Additionally, other permutations of wave modes can be included to attain the advantages above described, such as a horizontal shear wave in association with one of a compressional wave, a Lamb wave, a vertical shear wave, or combinations thereof. These and other similar modifications will readily suggest themselves to those skilled in the art, and are intended to be encompassed within the spirit of the present invention disclosed herein and the scope of the appended claims.

What is claimed is:

1. A method of evaluating a bond between a tubular and a bonding material comprising:
   (a) inducing a shear wave into the tubular;
   (b) monitoring the shear wave;
   (c) inducing a Lamb wave into the tubular;
   (d) monitoring the Lamb wave;
   (e) determining that the bond is present between the tubular and bonding material if the monitored shear wave is measurable; and
   (f) evaluating the bond based on monitoring the Lamb wave if the shear wave is not measurable.

2. The method of evaluating a bond of claim 1 further comprising determining the bond integrity.

3. The method of evaluating a bond of claim 2, wherein the step of determining the bond integrity is accomplished by monitoring the shear wave.

4. The method of evaluating a bond of claim 1 further comprising determining the presence of a micro-annulus by the evaluation of step (f).

5. The method of evaluating a bond of claim 1 further comprising determining the presence of free pipe conditions by the evaluation of step (f).

6. The method of evaluating a bond of claim 1, further comprising determining bond properties based on the monitoring of step (b) if the monitored shear wave is measurable, wherein said properties are selected from the list consisting of shear wave velocity, density, and combinations thereof.

7. The method of evaluating a bond of claim 6 wherein said bond comprises cement, said method further comprising determining the compressional velocity of the cement.

8. The method of evaluating a bond of claim 1, further comprising determining bond properties based on the monitoring of step (d), wherein said properties are selected from the list consisting of shear, compressional, density, and combinations thereof if the monitored shear wave is not measurable.

9. The method of evaluating a bond of claim 1, further comprising determining attenuations of different Lamb modes.

10. The method of evaluating a bond of claim 1 further comprising estimating the thickness of the bond.

11. The method of evaluating a bond of claim 1 wherein the type of bond evaluated is selected from the group consisting of regular cement, light weight cement, and free pipe.

12. The method of evaluating a bond of claim 1, wherein the step of inducing said shear wave and said Lamb wave is accomplished by a device selected from the list comprising a piezoelectric device, an electrically magnetized acoustic transmitter, a pulsed laser device, a flexural resonator, a wedge transducer, and combinations thereof.

13. The method of evaluating a bond of claim 1, wherein the step of monitoring said shear wave and said Lamb wave is accomplished by a device selected from the list comprising a piezoelectric device, an electrically magnetized acoustic transmitter, a wedge transducer, and combinations thereof.

14. The method of evaluating a bond of claim 1, wherein said shear wave comprises a transversely polarized shear wave.

15. A method of evaluating a bond disposed between a tubular and a wellbore comprising:
   (a) inserting a tool within the tubular, wherein said tool is capable of creating a shear wave and a Lamb wave;
   (b) creating a shear wave with said downhole tool into the tubular;
   (c) monitoring the amplitude of said shear wave passing through the bond;
   (d) creating a Lamb wave with said downhole tool and directing said Lamb wave into the tubular;
   (e) monitoring the amplitude of said Lamb wave passing through the bond;
   (f) determining if a bond exists between the tubular and the wellbore if the amplitude of the shear wave is measurable; and
   (g) estimating properties of the bond based on an evaluation of the amplitude of said Lamb wave if the amplitude of the shear wave is not measurable.

16. The method of evaluating a bond of claim 15, further comprising determining the presence of a micro-annulus based on the monitoring of step (e).

17. The method of evaluating a bond of claim 16, further comprising calculating the size of the micro-annulus.

18. The method of evaluating a bond of claim 15, further comprising determining the presence of free pipe conditions based on the monitoring of step (e).

19. The method of evaluating a bond of claim 15, further comprising determining bond properties based on the monitoring of step (c) wherein said properties are selected from the list consisting of shear wave velocity, compressional velocity, density, and combinations thereof if the amplitude of the shear wave is measurable.

20. The method of evaluating a bond of claim 19 wherein said bond comprises cement, said method further comprising determining the compressional velocity of the cement.

21. The method of evaluating a bond of claim 15, further comprising determining bond properties based on the monitoring of step (e), wherein said properties are selected from the list consisting of shear, compressional, density, and combinations thereof if the monitored shear wave is not measurable.

22. The method of claim of evaluating a bond of 15 further comprising determining attenuations of different Lamb modes.

23. The method of evaluating a bond of claim 15 further comprising estimating the thickness of the bond.

24. The method of evaluating a bond of claim 15 wherein the type of bond evaluated is selected from the group consisting of regular cement, light weight cement, and free pipe.

25. The method of evaluating a bond of claim 15, wherein the step of inducing said shear wave and said Lamb wave is accomplished by a device selected from the list comprising a piezoelectric device, an electrically magnetized acoustic transmitter, a pulsed laser device, a flexural resonator, and combinations thereof.

26. The method of evaluating a bond of claim 15, wherein the step of monitoring said shear wave and said Lamb wave is accomplished by a device selected from the list comprising a piezoelectric device, an electrically magnetized acoustic transmitter, and combinations thereof.

27. The method of evaluating a bond of claim 15, wherein said shear wave is selected from the list consisting of a vertical shear wave and a transversely polarized shear wave.

* * * * *